US008472436B2

(12) United States Patent
Meiri et al.

(10) Patent No.: US 8,472,436 B2
(45) Date of Patent: Jun. 25, 2013

(54) MODULAR WIRELESS DOCKING STATION

(75) Inventors: Dror Meiri, Haifa (IL); Tal Tamir, Even Yehuda (IL); Jorge Myszne, Zichron Yaaqov (IL)

(73) Assignee: Wilocity, Ltd., Caesarea (IL)

( * ) Notice: Subject to any disclaimer, the term of this patent is extended or adjusted under 35 U.S.C. 154(b) by 688 days.

(21) Appl. No.: 12/611,385

(22) Filed: Nov. 3, 2009

(65) Prior Publication Data

US 2010/0057969 A1 Mar. 4, 2010

Related U.S. Application Data

(63) Continuation-in-part of application No. 11/964,715, filed on Dec. 27, 2007.

(60) Provisional application No. 61/118,089, filed on Nov. 26, 2008.

(51) Int. Cl.
*H04Q 11/00* (2006.01)

(52) U.S. Cl.
USPC ..... 370/386; 370/310.2; 370/328; 370/395.5; 370/419; 370/463; 455/422.1; 710/303

(58) Field of Classification Search
USPC .............. 370/310.2, 328–339, 349, 386–388, 370/395.5, 419–426, 463; 455/422.1; 710/303, 710/304
See application file for complete search history.

(56) References Cited

U.S. PATENT DOCUMENTS

| 5,825,617 | A | 10/1998 | Kochis et al. | |
| 6,226,700 | B1 * | 5/2001 | Wandler et al. | 710/312 |
| 2003/0198015 | A1 | 10/2003 | Vogt | |
| 2005/0047079 | A1 * | 3/2005 | Gasbarro et al. | 361/686 |
| 2005/0220173 | A1 * | 10/2005 | Zyren et al. | 375/130 |
| 2005/0246470 | A1 | 11/2005 | Brenner | |
| 2006/0061963 | A1 | 3/2006 | Schrum | |
| 2008/0195788 | A1 * | 8/2008 | Tamir et al. | 710/303 |
| 2008/0288705 | A1 | 11/2008 | Tamir et al. | |
| 2009/0024782 | A1 | 1/2009 | Elboim | |

OTHER PUBLICATIONS

Digital-Logic AG: "Solution Guide Embedded Computer 2008, vol. II" (Fall issue), Sep. 5, 2008, Digital-Logic AG, Switzerland. URL: www.atlantis.com.ua/rpstr/catalog/2008_ecp_new.pdf Retrieved: Oct. 8, 2009.
PC/104 Embedded Consortium: "What is PCI/104-Express (TM)?", Rev. A, published Apr. 3, 2008.

* cited by examiner

*Primary Examiner* — Hoon J Chung
(74) *Attorney, Agent, or Firm* — Myers Wolin, LLC

(57) ABSTRACT

A modular wireless docking station for enabling a wireless connection between a computing device and a plurality of peripheral devices. The modular wireless docking station includes a radio plane having at least a wireless transceiver and at least one antenna for communicating with the computing device over a wireless medium; and a plurality of peripheral interface planes for communicating with one or more of the plurality of peripheral devices.

19 Claims, 4 Drawing Sheets

MODULAR WIRELESS DOCKING STATION

CROSS-REFERENCE TO RELATED APPLICATIONS

This application claims the benefit of U.S. Provisional Patent Application No. 61/118,089 filed on Nov. 26, 2008, the contents of which are herein incorporated by reference. This application is also a continuation-in-part of U.S. patent application Ser. No. 11/964,715 filed on Dec. 27, 2007, the contents of which are herein incorporated by reference.

TECHNICAL FIELD

The invention generally relates to docking stations.

BACKGROUND OF THE INVENTION

As technology has evolved the functionality of mobile devices, such as laptops computers, cellular phones, personal digital assistants (PDAs), and media players, has become correspondingly more robust. Such devices now offer capabilities that were once the exclusive domain of personal computers (PCs). In fact, some of these mobile devices now resemble small, low-end PCs with wireless access to data networks, including the Internet.

Unlike desktops or portable computers, hand-held devices and other wireless communication devices typically fail to include a keyboard, a large display, a mouse, a printer, or any other peripheral. In some instances such peripherals do exist but are either cumbersome or too small for effective use. Such devices may utilize a docking station or a port replicator to attach a standard set of peripheral devices to the computing platform. A physical connection is made, for example, between the hand-held device and the docking station, at which time the docking station provides the necessary ports to connect to those peripherals.

The primary purpose of replicators or docking stations is to provide a fast and convenient mechanism to allow the hand-held device to attach or detach from peripheral devices. This is achieved by plugging the hand-held device into the docking station, however, it is not necessary to physically connect and disconnect each of the peripheral devices from the hand-held device.

With the emergence of wireless technologies, hardwired docking station connections are replaced with a wireless connection, typically by means of an ultra-wideband (UWB) connection. Examples for such wireless docking stations can be found in US Patent Application Publications Nos. 20050246470, and 20060061963, incorporated herein by reference for the useful understanding of the background of the invention. The solutions in the above-mentioned publications enable wireless connectivity between a hand-held device and its respective peripherals by providing a wireless computer docking system. Specifically, a hand-held device is equipped with a UWB wireless transceiver to form a wireless connection with UWB-enabled peripheral devices without the need for a physical docking station. That is, these solutions are based on a UWB link that emulates an undefined type of input/output (I/O) bus.

Such architectures introduce major drawbacks that limit the performance of hand-held devices. For example, the UWB link requires a dedicated-controller to allow the I/O bus to operate with different peripheral standards. It also requires the installation of dedicated software to map peripheral interfaces to the I/O bus. In addition, the UWB link multiplexes between peripheral devices in order to transfer data on a relatively small bandwidth.

Another type of modular connectivity solution is based on peripheral interface cards. Typically, the peripheral interface cards are stackable, enabling connectivity to each other. In addition, all interface cards must be connected to a base plane card which facilitates the communication with the hand-held computing device. To this end, the base plane includes a central processing unit (CPU) and a memory unit. Connectivity between cards is enabled using, for example, a PCI/104-Express™ standard interface, published by the PC/104 Embedded Consortium in 2008 in an article titled "What is a PCI/104-Express?" An example for such a modular connectivity solution is commercially available by Digital Logic. Other examples for implementing modular connectivity may be found in US patent application publication No. 20030198015 and in U.S. Pat. No. 5,825,617, incorporated herein by reference for the useful understanding of the background of the invention.

One drawback of existing modular docking stations described in the related art is that the base plane card consists of a CPU and a memory unit and the operation of a station requires the installation of dedicated software to map peripheral interfaces to the I/O bus. As a result, the cost of such is significantly increased. In addition, existing modular docking stations do not allow wireless connectivity between the peripheral devices and hand-held computing devices.

It would be therefore advantageous to provide a docking system that enables a modular and wireless connectivity while overcoming the drawbacks of prior art solutions.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION OF THE INVENTION

Figure 1:
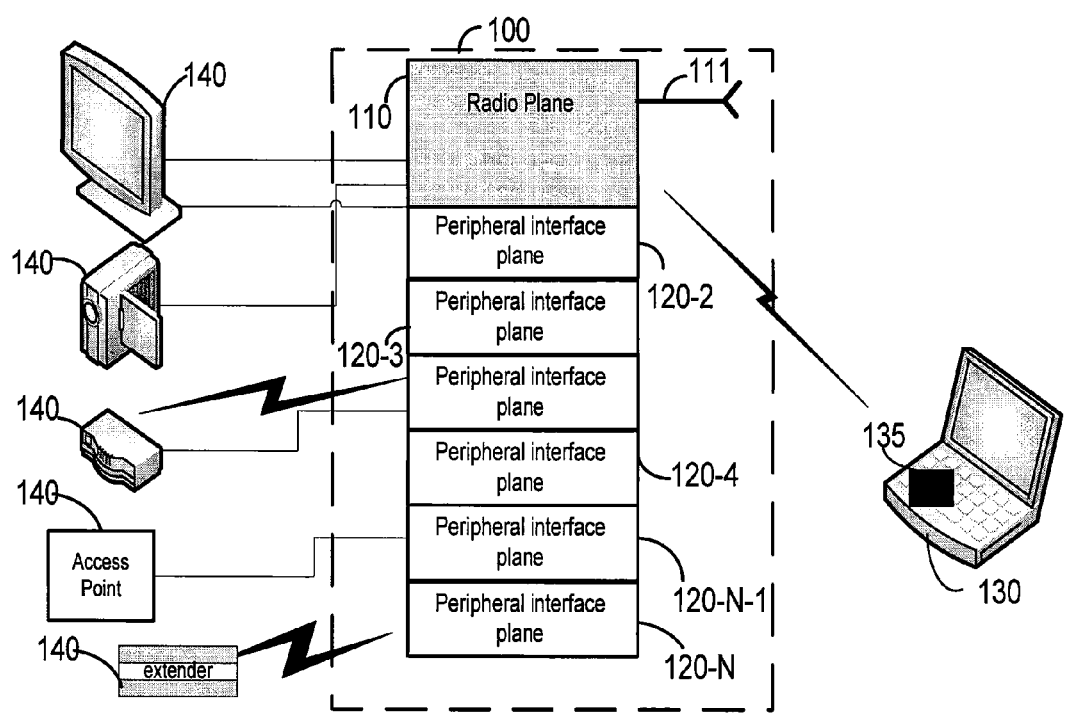
FIG. 1 is a block diagram of a modular wireless docking station constructed in accordance with certain exemplary embodiments of the invention.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a block diagram of a modular wireless docking station 100 constructed in accordance with certain exemplary embodiments of the invention. The modular docking station 100 consists of a radio plane 110 coupled to a plurality of peripheral interface planes 120-1 to 120-N. In one embodiment, the peripheral interface planes 120-1 to 120-N are stacked together at the bottom of the radio plane 110. The modular docking station 100 is wirelessly connected to a hand-held computing device 130 which includes, but is not limited to, a personal computer, a netbook computer, a laptop computer, a notebook computer, a media player, a mobile phone, a personal digital assistant (PDA), and the like.

The peripheral interface planes 120-1 to 120-N may communicate with any type of peripheral devices 140 including, but not limited to, a monitor, a keyboard, a pointing device, a mouse, a storage device, a speaker, a microphone, a modem, a compact disk (CD) player, a digital video disc (DVD) player, a display, a television, a projector, a router, a switch, an access point, and the like. The connections between the peripheral devices and the peripheral interface planes 120-1 to 120-N may be utilized using, for example, any version of a peripheral component interconnect-Express (PCIe) bus, any version of a universal serial bus (USB) bus, a parallel bus, a RS232 serial bus, a PS/2-style mouse connection, a keyboard connection, an audio like connection, a direct attached storage (DAS) connection, a serial advanced technology attachment (SATA) bus, a high-definition multimedia interface (HDMI), a digital visual interface (DVI), a DisplayPort™ interface, a video graphics array (VGA), and so on. Therefore, the modular wireless docking station 100 can be adapted to function as a residential gateway, a multimedia center, a gaming console, a range extender (repeater), a DAS, a network attach storage, and the like.

The planes 110 and 120-1 to 120-N can also communicate between themselves only, and form an applicative system. That is, the wireless modular docking 100 can also be a self contained system for one or more applications without being connected to peripherals. In addition an interface plane may be a rechargeable battery plane, enabling a portable docking of a device.

In one embodiment of the invention all planes 110 and 120-1 to 120-N have the same physical dimensions (i.e., height, width, and length) and can be easily assembled by a user according to his needs. That is, a user can add or remove any of the peripheral interface planes 120-1 to 120-N in order to achieve the desired connectivity. In a preferred embodiment of the invention the radio plane 110 which includes at least one antenna 111 is the upper plane. This may advantageously enable good reception and transmission of wireless signals and to achieve optimal coverage.

The mechanical measures and the modularity of the docking station 100 allow a user to easily pack and carry only the planes that provide the functionality of interest. For example, when traveling a user may carry only the radio planes 110 and interface planes 120 that provide connectivity to a larger display and a mass storage device.

Figure 2A:
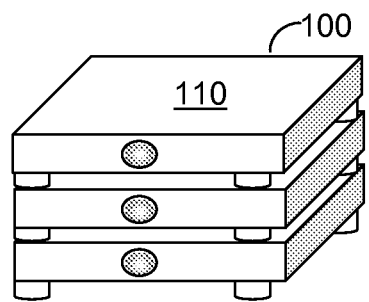
FIGS. 2A, 2B, and 2C are a three-dimensional view, a front view and a rear view of the modular wireless docking station.
Figure 2B:
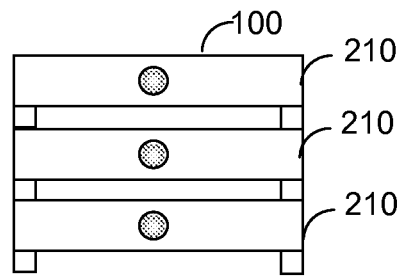
Figure 2C:
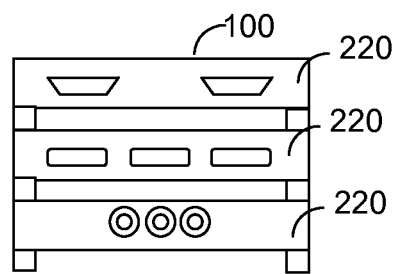

FIGS. 2A, 2B, and 2C receptively show a three-dimensional view, a front view and a rear view of the modular wireless docking station 100. The upper plane is the radio plane 110. As can be noticed the front panels 210 (FIG. 2B) of the planes include indicators preferably in the form of light-emitting-diodes (LEDs), and the back panels 220 (FIG. 2C) of the planes 120 include connectors to the peripheral devices 140. It should be noted that the modular wireless docking station 100 can be assembled according to predefined configuration by a vendor or distributor of consumer electronic devices.

Figure 3:
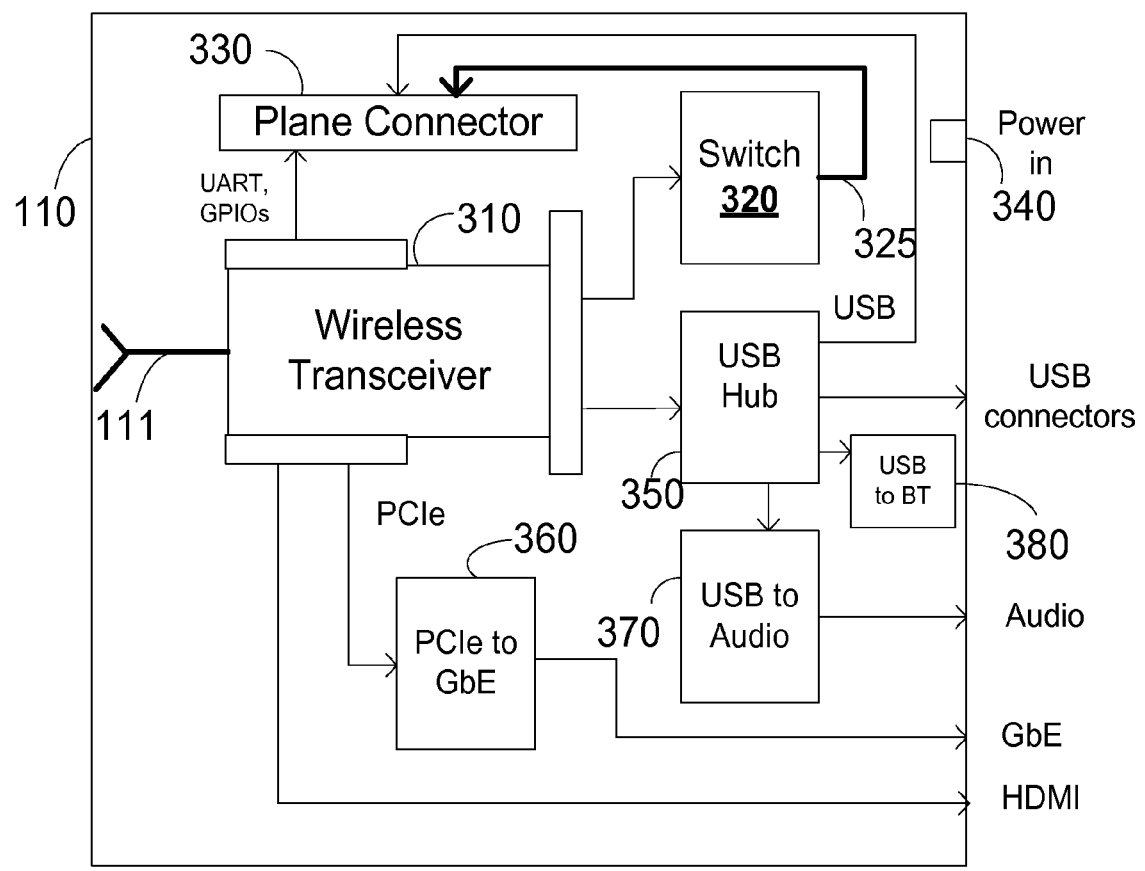
FIG. 3 is a block diagram of a radio plane constructed in accordance with certain exemplary embodiments of the invention.

FIG. 3 shows a non-limiting and exemplary block diagram of a radio plane 110 constructed in accordance with an embodiment of the invention. The radio plane 110 includes a wireless transceiver 310 connected to at least one antenna 111 and a switch 320 which is coupled to a plane connector 330 through a data bus 325, which may be, for example, a PCI, a PCIe, a GPIO, and the like. The plane connector 330 enables connectivity with the lower planes 120-1 to 120-N.

The wireless transceiver 310 receives and transmits wireless signals from and to the hand-held device 130 having wireless transceiver 135 (shown in FIG. 1). In one embodiment of the invention the wireless transceivers 310 and 135 emulates a wireless distributed interconnect bus. In this embodiment the wireless link between the transceiver 310 and transceiver 135 aggregates an unbound number of PCIe lanes with a transfer data rate of 2.5 Gb/s per lane over an unlicensed frequency band, such as 57-66 GHz or 5-6 GHz. It should be apparent to one with ordinary skill in the art that the bandwidth of the aggregated lanes is sufficient to transfer data from or to peripherals over a wireless medium without multiplexing between peripherals. The wireless transceiver 310 controls and manages the access to the wireless link in either a full-duplex or half-duplex mode of operation. Furthermore, the wireless transceiver 310 establishes a wireless link between the modular docking station 100 and the hand-held device 130 and may act as a medium access controller (MAC) layer. The operation of the wireless distributed interconnect bus is further described in US patent application publication No. 2008/0288705 to Tamir, et al. entitled "A Wireless Peripheral Interconnect Bus" and in US patent application publication No. 2009/0024782 to Elboim entitled "Distributed Interconnect Bus Apparatus." Both applications are assigned to common assignee and each of which is hereby incorporated herein by reference.

To perform the tasks mentioned above the wireless transceiver 310 preferably includes a wireless receiver and wireless transmitter (not shown) that together implement a wireless modem, such as an orthogonal frequency division multiplexing (OFDM) modem, a single-carrier modem, a multi-carrier modem, and the likes. Furthermore, the wireless receiver and wireless transmitter can implement sophisticated communication techniques, such as multiple-input-multiple-output (MIMO), beam forming, advanced coding, space time block codes, and so on.

The data constructed by the wireless transceiver 310 is fed to the switch 320 which may be operated in accordance to any standard that includes, but is not limited to, USB, PCIe, Hypertransport, Infiniband, and the like. In a preferred embodiment, the switch is a PCIe switch. The modular docking station 100 may include a USB hub 350 and one or more bridges for transforming data from a first protocol type to a second protocol type. As shown in FIG. 3, a bridge 360 bridges between PCIe to Gigabit Ethernet, thereby enabling an interface to a Gigabit Ethernet network. The bridge 370 converts a USB data format to an audio like format, thereby enabling connectivity to audio devices. The plane 110 also includes a bridge 380 adapting USB data format to a Bluetooth® data format, thereby enabling Bluetooth communication with peripheral devices. It should be apparent to one of ordinary skill in the art that the bridges 360, 370, 380 described herein are merely examples and other type of bridges can be utilized for protocol conversions. The radio plane 110 is powered up through a power-in input 340.

Figure 4:
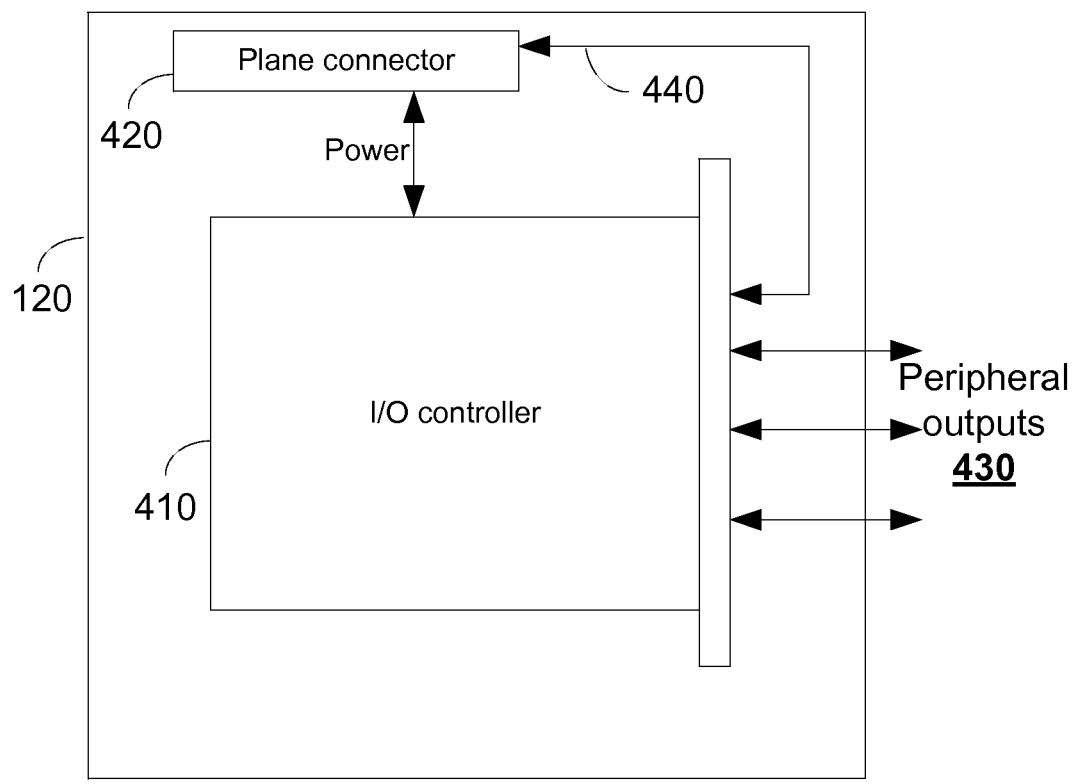
FIG. 4 is a block diagram of a peripheral interface plane constructed in accordance with an embodiment of the invention.

FIG. 4 shows an exemplary block diagram of a peripheral interface plane 120 constructed in accordance with certain exemplary embodiments of the invention. The peripheral interface plane 120 includes an I/O controller 410 and a plane connector 420 enabling the connectivity with a lower plane 120 and with an upper plane, which may be either the radio plane 110 or another peripheral interface plane 120. In certain embodiments two plane connectors are utilized, one to the upper plane and one to the lower plane. The signals at the plane connector 420 are power signals and bus signals of a bus 440. The bus 440 signals may be, but is not limited to, a PCIe, a USB, a General Purpose Input/Output (GPIO), and more. That is, the communication between the planes is realized by the type of the bus 440.

The I/O controller 410 interfaces and manages the communication between peripheral devices connected to the docking station 100 and the hand-held device 130 through one or more peripheral outputs 430. The peripheral outputs 430 may be, but are not limited to, PCIe, USB, parallel, RS232 serial, PS/2-style mouse, SATA, VGA, DVI, HDMI, and others. The I/O controller 410 communicates with a specific type of peripheral device. For example, to interface with display devices the I/O controller is a graphics processing unit (GPU) that outputs display like interfaces including, for example, HDMI, DisplayPort™, DVI, VGA, and the like. The I/O controller 410 may also be implemented as an express card, a PCIe mini card, or a PCIe half mini-card.

The I/O controller 410 manages the communication between the peripherals and the hand-held device, thus there is no need to install dedicated software to map standard peripheral interfaces to a format of a dedicated bus.

In accordance with an embodiment of the invention, the modular docking station 100 can be mounted on a wireless power plane. The wireless power plane generates an electromagnetic field to recharge hand-held batteries wirelessly.

The modular wireless docking station 100 and the hand-held computing device 130 implement a dock-in process and a dock-out process. The dock-in process refers to wireless connecting of the hand-held computing device 130 to the modular wireless docking station 100. Such connection is achieved if a hand-held device 130 is placed in proximity of the modular system docking station 100.

The dock-out process refers to disconnecting the hand-held computing device 130 from the modular wireless docking station 100 by moving the hand-held device out of "docking range." The dock-in and dock-out processes are described in greater detail in U.S. application Ser. No. 11/964,715 assigned to the common assignee and the contents of which are herein incorporated by reference. In accordance with an exemplary embodiment of the invention the dock-in and dock-out processes can be implemented as "hot" plug-in and plug-out. That is, connecting or disconnecting the hand-held device while still operating. In accordance with an embodiment, dock-in and dock-out processes are performed without the need to install dedicated software, hardware, or combination thereof either in the hand-held device of the modular docking station.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto. All examples and conditional language recited herein are intended for pedagogical purposes to aid the reader in understanding the principles of the invention and the concepts contributed by the inventors to furthering the art, and are to be construed as being without limitation to such specifically recited examples and conditions.

The invention claimed is:

1. A modular wireless docking station for enabling a wireless connection between a computing device and a plurality of peripheral devices, comprising:
   a radio plane including at least a wireless transceiver and at least one antenna for communicating a wireless Peripheral Component Interconnect-Express (PCIe) bus with a host bridge coupled to a central processing unit (CPU) of the computing device over a wireless medium, wherein the radio plane includes at least one bridge for transforming data compliant with a first protocol type to data compliant with a second protocol type, wherein the wireless transceiver emulates the wireless PCIe bus; and
   a plurality of peripheral interface planes for communicating with the plurality of peripheral devices, wherein each of the plurality of peripheral interface planes includes at least one input/output (I/O) controller compliant with the respective peripheral device with which the peripheral interface plane interfaces.

2. The modular wireless docking station of claim 1, wherein the plurality of peripheral interface planes are stackable.

3. The modular wireless docking station of claim 2, wherein each of the plurality of peripheral interface planes is either connected to the bottom of the radio plane or to another peripheral interface plane of the plurality of peripheral interface planes.

4. The modular wireless docking station of claim 3, wherein each of the plurality of peripheral interface planes can be removed or inserted to the modular wireless docking station to achieve a desired functionality.

5. The modular wireless docking station of claim 1, wherein the communication between the plurality of peripheral interface planes or the communication between the plurality of peripheral interface planes and the radio plane is achieved by means of a data bus.

6. The modular wireless docking station of claim 5, wherein the data bus is any one of: a PCIe, a USB, a General Purpose Input/Output (GPIO).

7. The modular wireless docking station of claim 1, wherein the radio plane further comprising:
   a plane connector for allowing connection to a peripheral interface plane of the plurality of peripheral interface planes; and
   a universal serial bus (USB) hub.

8. The modular wireless docking station of claim 7, wherein the wireless transceiver implements a wireless modem and is configured for transmitting and receiving wireless signals over a frequency band.

9. The modular wireless docking station of claim 8, wherein the frequency band is at least one of: 57 GHz-66 GHz and 5 GHz-6 GHz.

10. The modular wireless docking station of claim 1, wherein each of the plurality of peripheral interface planes comprising:
    a plane connector; and
    at least one peripheral output to allow a connection between at least one peripheral device and the peripheral interface plane.

11. The modular wireless docking station of claim 10, wherein the connection between the at least one peripheral device and each of the plurality of peripheral interface planes is configured as any one of: a PCIe connection, a PCI connection, a USB connection, a parallel connection, a RS232 serial connection, a PS/2-style mouse connection, a keyboard connection, an audio connection, a serial advanced technology attachment (SATA) connection, a video graphics array (VGA) connection, a digital visual interface (DVI) connection, a Display Port (DP), and a high-definition multimedia interface (HDMI).

12. The modular wireless docking station of claim 1, wherein the radio plane and the plurality of peripheral interface planes have the same physical dimensions.

13. The modular wireless docking station of claim 1, wherein the computing device is at least a hand-held computing device.

14. The modular wireless docking station of claim 13, wherein the modular wireless docking station is wirelessly connected to the computing device using a dock-in process.

15. The modular wireless docking station of claim 13, wherein the modular wireless docking station is wirelessly disconnected from the computing device using a dock-out process.

16. A radio plane mounted in a modular wireless docking station configured to enable a wireless connection between a computing device and a plurality of peripheral devices, comprising:
 a wireless transceiver for transmitting and receiving wireless signals over a frequency band and to allow a communication, over a wireless Peripheral Component Interconnect-Express (PCIe) bus, between the modular docking station and a host bridge coupled to a central processing unit (CPU) of the computing device over a wireless medium, wherein the wireless transceiver emulates the wireless PCIe bus;
 a plane connector for allowing a connection to a peripheral interface plane;
 at least one antenna;
 at least one bridge for transforming data compliant with a first protocol type to data compliant with a second protocol type; and
 a data bus for exchanging data with the peripheral interface plane and the computing device.

17. The radio plane of claim 16, further comprising:
 a switch coupled between the wireless transceiver and the plane connector; and
 a universal serial bus (USB) hub.

18. The radio plane of claim 16, wherein the wireless transceiver implements a wireless modem.

19. The radio plane of claim 18, wherein the frequency band is at least one of: 57 GHz-66 GHz and 5 GHz-6 GHz.

* * * * *